March 7, 1933.    C. H. LAND ET AL    1,900,115
FIFTH WHEEL FOR CONNECTING TRACTORS TO DIFFERENT TYPES OF TRAILERS
Filed March 3, 1932    3 Sheets-Sheet 1
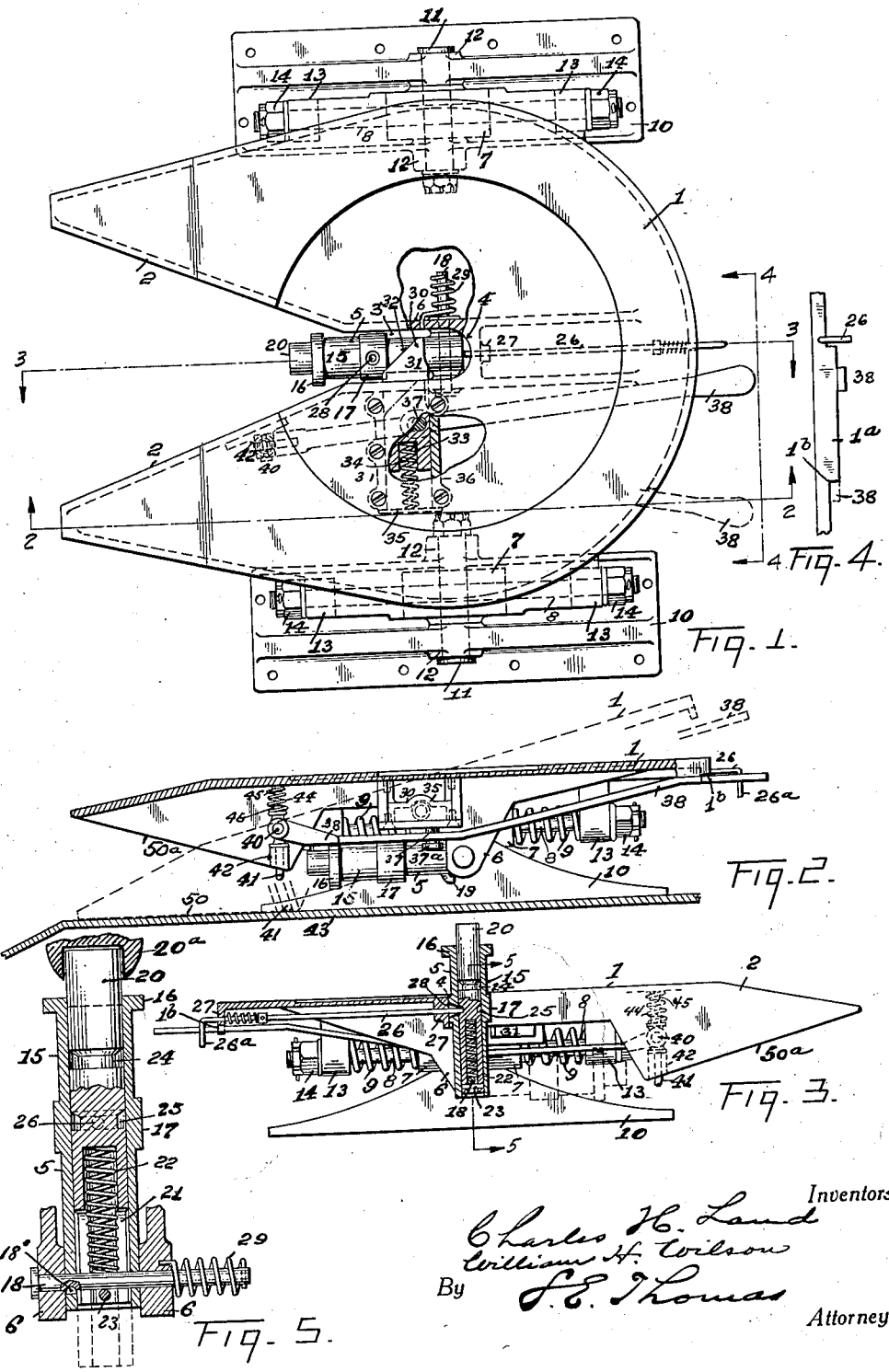

March 7, 1933.  C. H. LAND ET AL  1,900,115
FIFTH WHEEL FOR CONNECTING TRACTORS TO DIFFERENT TYPES OF TRAILERS
Filed March 3, 1932   3 Sheets-Sheet 2
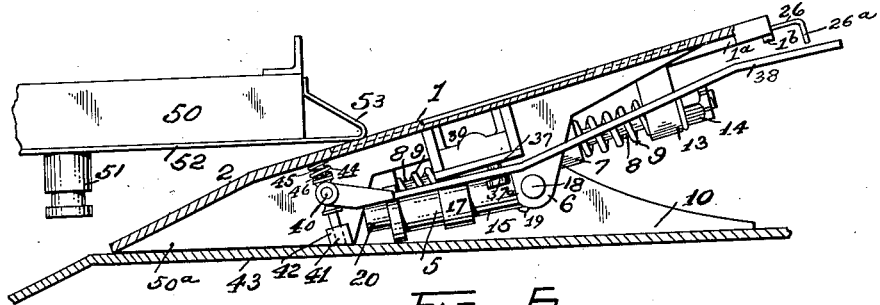
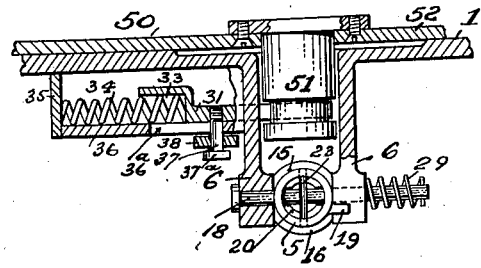
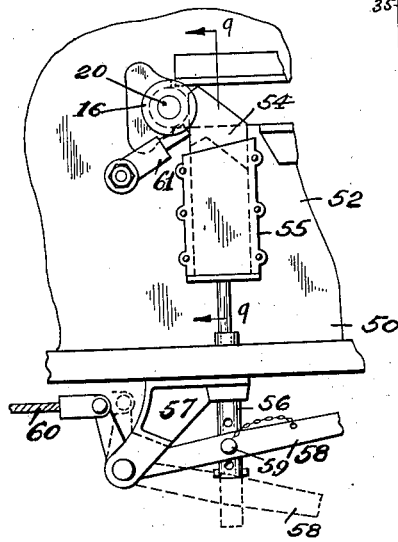
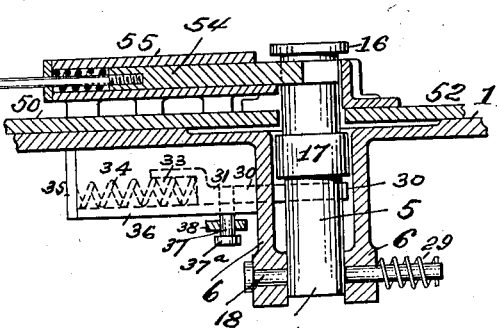
Inventors
Charles H. Land
William H. Wilson
By S. E. Thomas
Attorney March 7, 1933.   C. H. LAND ET AL   1,900,115
FIFTH WHEEL FOR CONNECTING TRACTORS TO DIFFERENT TYPES OF TRAILERS
Filed March 3, 1932   3 Sheets-Sheet 3
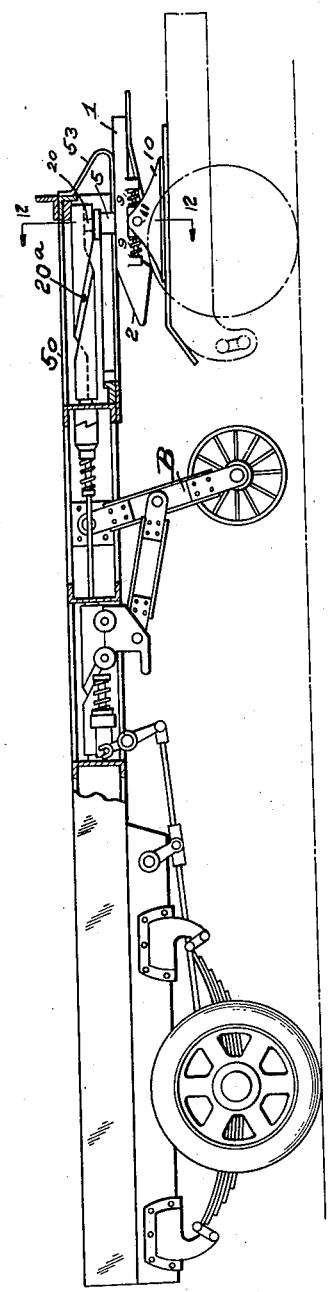
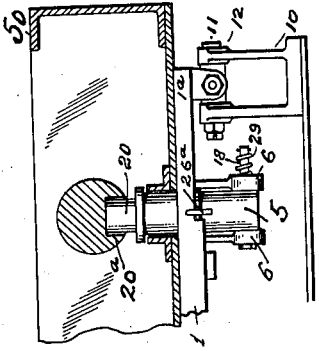
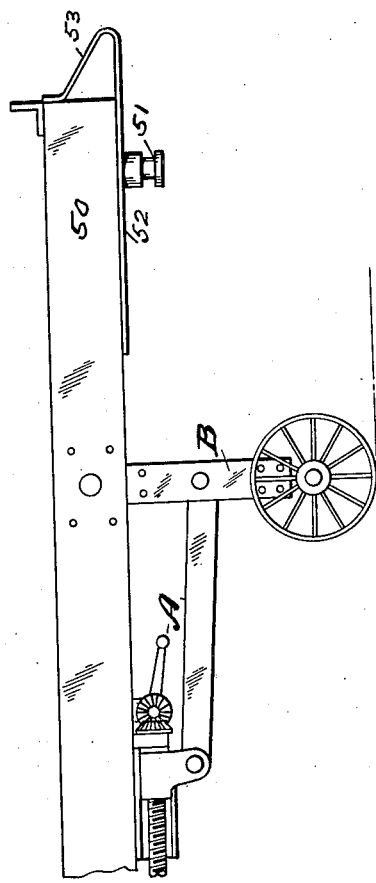
Inventors
Charles H. Land
and William H. Wilson
By
S. E. Thomas   Attorney Patented Mar. 7, 1933

1,900,115

UNITED STATES PATENT OFFICE

CHARLES H. LAND, OF GROSSE POINTE, AND WILLIAM H. WILSON, OF DETROIT, MICHIGAN

FIFTH WHEEL FOR CONNECTING TRACTORS TO DIFFERENT TYPES OF TRAILERS

Application filed March 3, 1932. Serial No. 596,518.

This invention relates to an adaptable fifth wheel for tractors and is designed for connecting the hauling vehicle to different types of semi-trailers.

Semi-trailers are provided with supporting wheels at the rear end, and at their front end are fitted with supporting legs which are either manually or automatically raised upon coupling the tractor to the trailer.

There are in general use several types of tractor-trailers respectively equipped with either upstanding or depending king-pins whereby a coupling engagement may be obtained between the hauling vehicle and the trailer.

It is therefore desirable to provide a fifth wheel for the tractor, which may be quickly adapted for coupling with different types of trailers.

The primary object of the present invention is to provide a fifth wheel for the tractor or hauling vehicle, equipped with a king-pin which may be raised to an upstanding position to engage coordinating mechanism carried by a trailer,—to effect a coupling relation between the tractor and trailer,—said king-pin being adapted to fold down out of the way in order that the locking mechanism carried by the tractor may be coupled with a depending king-pin carried by a trailer.

A further object of this invention is to provide the fifth wheel member of a tractor with a locking device, adapted to couple the trailer with a depending king-pin or other coordinating element carried by the trailer;—the fifth wheel being also fitted with a lever mechanism for releasing the lock, and means for holding the lock in a retracted position until the contacting position of the trailer upon the fifth wheel of the tractor is such that the trailer automatically releases the lock whereby it may engage the king-pin or other coordinating coupling element of the trailer.

A further object of this invention is to provide the fifth wheel member on the tractor with a foldable king-pin having a central telescopic driving pin for actuating a trailer supporting leg element, that the leg element may occupy either a supporting or a non-supporting position as required.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a lower fifth wheel member adapted to be rigidly attached to a plate secured to a tractor frame,—including a king-pin which may be swung from an operative vertical position, into a horizontal inoperative position,—a portion of the plate being broken away,—with parts in section,—to more clearly disclose the construction.

Figure 2 is a side elevation and sectional view taken on or about line 2—2 of Figure 1, showing the fifth wheel in a horizontal position,—and in dotted lines the fifth wheel as when normally inclined rearwardly due to its unbalanced weight, to receive the forward end of the trailer,—also the relation of the lock actuating lever to the lock.

Figure 3 is a side and sectional view taken on or about line 3—3 of Figure 1, with a king-pin in vertical position that it may engage a coordinating element carried by the trailer.

Figure 4 is a fragmentary side elevation of the fifth wheel viewed from the dotted line 4—4 of Figure 1 in the direction indicated by the arrows.

Figure 5 is a vertical cross-sectional view through the swinging king-pin and its inclosing sleeve,—showing in dotted lines the king-pin held in retracted position therein,— by a locking pin,—indicated in dotted lines.

Figure 6 is a vertical sectional view through the fifth wheel of a tractor when tilted,— taken on or about line 2—2 of Figure 1,—and showing diagrammatically a fragmentary side elevation of a trailer, fitted with a depending king-pin, ascending the fifth wheel of the tractor as when entering into coupling relation with the latter.

Figure 7 is a fragmentary cross-sectiona view through the fifth wheel of a tractor, and the frame of a trailer, coupled to the fifth wheel of the tractor, with the folding king-pin of the tractor rocked to a horizontal inoperative position.

Figure 8 is a fragmentary plan view of a trailer, including a latch mechanism, securing the swinging king-pin of the fifth wheel of a tractor in locked coupling relation with the trailer.

Figure 9 is a fragmentary cross-sectional view of the fifth wheel of a tractor and the locking latch of a trailer, taken on or about line 9—9 of Figure 8, showing the rockable king-pin of the tractor elevated and locked in coupling relation with the trailer by the spring actuated latch carried by the trailer, the telescoping driving pin of the king-pin—see Figure 5—having been depressed.

Figure 10 is a diagrammatic side elevation of a trailer,—its forward end being partly in section,—mounted upon the fifth wheel of a tractor, with a fragmentary portion of the latter shown in dotted lines.

Figure 11 is a fragmentary side elevation illustrating another type of trailer adapted to cooperate with the tractor coupling member,—the legs of the trailer being lowered to support the forward end of the trailer, which is shown disconnected from a tractor.

Figure 12 is a fragmentary cross-sectional view taken on or about line 12—12 of Figure 10,—showing the telescopic driving pin of the hinged king-pin, extending into the spiral groove of the driving shaft.

Referring now to the reference numerals placed upon the drawings:

The general structure of the fifth wheel is similar to that in use at the present time.

The numeral 1 indicates a main tilting table having inclined walls 2, 2 at its rear end forming a wedge-shaped opening diverging from a channel-like passage 3, having a semi-circular wall 4 at the forward end of the channel to receive a dependent king-pin 51 on a trailer 50 and also to form a positioning semi-circular wall for a folding king-pin 5, when in an upright position. The king-pin 5 is pivoted between bracket walls 6, 6 depending from the underside of the tilting table.

Numerals 7, 7 denote sleeves, slidable on bars 8, 8 against draft springs 9, 9 and are pivotally connected to brackets 10, 10 by means of pins 11, 11 journaled in the hubs 12, 12 of the brackets. The draft springs 9, 9 are retained by lugs 13, 13 projecting from the tilting table. The draft springs 9, 9 are held in position by nuts 14, 14.

Supported in the fifth wheel member is the folding or pivoted king-pin 5. It comprises an inclosing sleeve 15 with a projecting rim 16 at its outer end, and spaced substantially midway therefrom is a projecting shoulder 17.

The lower end of the sleeve is pivoted and keyed at $18^1$ to a shaft 18 journaled between the bracket walls 6, 6 depending from the underside of the tilting table. A stop lug 19 is provided at its lower end to limit the folding or swinging movement of the king-pin.

Telescopically fitted in the inclosing sleeve 15 of the king-pin is a driving pin 20, having slots 21 at its lower end to permit the drive pin to be compressed sufficiently that the upper face of the driving pin may be substantially flush with the outer sleeve or king-pin.

The driving pin is also bored to receive a coiled expansion spring 22 which serves to force the driving pin outwardly when required. This spring is seated on the shaft 18, extending through the bracket walls 6, 6 and the sleeve 15 of the king-pin,—to which it is keyed.

The upward movement of the driving pin 20 is limited by means of a transverse pin 23 supported in the wall of the sleeve.

The telescopic driving pin 20 is provided with two peripheral grooves 24 and 25 spaced apart that they may respectively receive the end of a spring actuated locking bar-bolt 26 to secure the driving pin in its projected or retracted positions, in relation to the end of the sleeve.

The locking bar-bolt 26 is supported in lugs 27, 27 projecting downwardly from the tilting table and at one end projects through a tapered hole 28 in the sleeve to assist in guiding it into the respective peripheral grooves 24 and 25. The locking bar 26 is provided at its outer end with a handle $26^a$ to facilitate its manual operation.

Mounted on the projecting end of the shaft 18 is a coiled spring 29, with one end of the spring extending through a transverse hole in the end of the shaft, the other end of the spring extends into an aperture provided in one of the bracket walls 6, see Figure 5,—depending from the underside of the tilting table.

The spring is designed to throw the king-pin into an inactive position as shown in Figures 1 and 2, when the tractor is coupled to a trailer fitted with a depending king bolt—see Figure 7—or other like coupling member.

A locking device 30 is provided to hold the folding king-pin in its upright position which also serves as an engaging means for a dependent king-pin 51—see Figures 6 and 7, carried by the trailer.

This locking device consists of a flat latch bolt 31, wedge-shaped at one end as indicated at 32 and recessed at the other as shown at 33, see Figure 1, to receive an expansion spring 34 bearing at its outer end against an end plate 35 of the housing 36 bolted to the underface of the tilting table.

The lower wall of the latch bolt housing is slotted at $36^a$—see Figure 7—to permit the movement of a pin 37 screwed into the lower face of the latch bolt and is provided with a shoulder 37ᵃ at its outer end to retain a lever 38 yoked around the bar.

The lever 38 has a yoke-shaped construction at its outer end and is pivotally connected by a pin 40 to a vertical trip pin 41 supported in a suitable housing 42 in turn bolted to a downwardly extending wall of the fifth wheel, see Figures 1, 2 and 6.

The lower end of the trip pin 41 projects through the housing that it may bear upon the plate 43 on which the brackets 10 of the fifth wheel are mounted.

An expansion spring 44 is held by a stub pin 45 projecting downwardly from the tilting plate and a stub pin 46 projecting upwardly from the housing 42.

The tilting table has a flange 1ᵃ projecting downwardly from its outer marginal edge, see Figures 1, 2, 4 and 6, forming a shoulder 1ᵇ to secure the lever 38 when withdrawing the spring actuated latch 31 from locking engagement with the king bolt or other coordinating coupling means carried by the trailer.

The numeral 50 indicates diagrammatically a trailer fitted with a depending king-pin 51 bolted to a plate 52 riveted to the side channel-rails of the trailer and forming at its forward end a projecting arcuate-shaped skid 53 secured to the cross-member of the trailer frame.

A spring actuated latch 54 having a bevel-shaped end is supported in a housing 55 bolted to the plate 52.

A pull rod 56 screwed to the end of the latch bolt extends through the latch housing, a hole in the frame of the trailer, and a lug in a bracket 57 attached to the frame of the trailer.

A lever 58 is pivoted to the bracket 57 and is provided with a removable pin 59 for detachably connecting the lever with the pull rod 56. The lever 58 is connected by cable 60 with brake operating mechanism,—not shown.

A swinging pawl 61 overlapping the spring actuated latch 54 holds the latter in retracted position until released by the thrust of a king-pin against the pawl when entering into coupling relation with the tractor,—the spring latch thereupon becomes effective to lock the king-pin in coupling relation with the trailer.

Having indicated the several parts by reference numerals, the construction and operation of the device will be readily understood:

When it is desired to couple the tractor to trailers equipped with locks for upstanding king-pins, the parts on the fifth wheel may be quickly adjusted to receive and coordinate with different types of locking mechanism carried by the trailer.

If the king-pin is in a folded or a horizontal position as shown in Figures 1 and 2 of the drawings, it must be manually brought to an upright position to coordinate with the coordinating locking mechanism of the trailer.

To accomplish this, the operator retracts the latch-bolt 31 by the operation of the lever 38, thereby clearing the channel passage 3—see Figure 1. The operator then grasps the end of the king-pin 5 raising it to an upright position or until the projecting shoulder 17 of the king-pin contacts with the positioning semi-circular wall 4 at the end of the channel-like passage,—see Figure 3.

The lever 38 being then released, the latch bolt 31 is returned by the spring 34 to its initial position that it may engage or lock the king-pin 5.

Coincident with locking the king-pin by the latch 31, the spring actuated bolt or bar 26 registers with the tapered hole 28 in the sleeve 15, and passing through the tapered hole enters the peripheral groove 25 of the drive pin 20.

The telescoping drive-pin 20 is now locked and ready to automatically actuate a spirally grooved driving shaft 20ᵃ—see Figures 5 and 10—adapted to actuate the supporting leg B and the coupling mechanism of a semi-trailer shown in and described in Patents No. 1,686,698, October 9th, 1928; No. 1,753,011, April 1st, 1930; No. 1,781,399, November 11th 1930; and No. 1,774,894, September 2nd, 1930, issued to Charles H. Land.

There are conditions however when the drive pin 20,—required for actuating this well-known trailer mechanism, is not necessary to effect a coupling relation with the type of trailer to which it is to be coupled.

Under said last named conditions, the king-pin is raised to a vertical position however as previously described,—the locking bar-bolt 26 being then withdrawn from the groove 25 and the pin 20 forced downwardly against the action of the spring 22 until the groove 24 registers with the hole 28, in the sleeve.

The locking bar-bolt 26 is then released whereupon it slides into the groove 24, locking the drive pin 20 in a retracted position against outward movement.

The slots 21 are provided to permit an inward movement of the drive pin 20,—the limit of outward movement of the driving pin 20 when used for driving purposes is controlled by a transverse pin 23,—contacting with the shaft 18.

When it is desired to couple the tractor to a trailer having a dependent king-pin—see Figure 6—and the king-pin on the fifth wheel has been locked in an upright position,—it is necessary to first retract the locking latch 31 from the channel passage 3 by manually operating the lever 38.

The king-bolt being thus released is then automatically rocked by the spring 29 through the channel opening 3 in the tilting table 1 to an out-of-the-way position,—limited by the stop lug 19, upon striking the bracket depending from the underside of the tilting table, see Figure 2.

When the dependent king-pin of the trailer strikes the beveled end of the latch 31, it forces it out of the channel passage 3, it being noted that this movement does not swing the lever 38 far enough for it to engage in notch 1ᵃ. Therefore when the king-pin of the trailer contacts with the semi-circular wall 4, the latch 31 will return, locking the king-pin in coupling engagement with the trailer.

To uncouple the tractor from a trailer having a dependent king-pin, the lever 38 is pulled until the edge of the lever is caught in the notch 1ᵇ—see Figures 1 and 4—formed by the downwardly projecting rim 16 of the tilting table;—the expansion spring 44 holding it in the notch until released,—see Figure 6.

The lever 38 being yoked and pinned to the turnable trip pin 31 may be swung and rocked to any required position. The lever therefore is employed to retract the latch 31 against the action of the coil spring 34, and when held by the notch 1ᵇ, the tractor may be driven away from the trailer carrying a dependent king-pin.

When the front end of the trailer passes the rocking center line of the fifth wheel of the tractor, it tends to depress the tilting table of the fifth wheel rearwardly until the depending flared walls 50ᵃ of the fifth wheel contact with the supporting plate 43 of the tractor, see Figure 2.

The projecting trip pin 41 contacts with the plate 43 just before the walls 50ᵃ are seated upon the supporting plate. The weight of the trailer forces the trip pin 41 upwardly thereby releasing the lever 38 from the engaging shoulder 1ᵇ on the rim of the tilting table—see Figure 6. The latch 31 is then returned to its normal position in the channel passage 3 by the action of the coil spring 34, ready for another coupling operation.

If the latch 31 is left in a retracted position prior to a coupling operation, the contact of the trailer upon coupling will trip the latch ahead of the final position of the dependent king-pin.

In the trailer shown in Figure 8, no means are indicated for actuating—either automatically or manually—a supporting leg shifting mechanism, as disclosed in our application for patent on means for coupling tractors to trailers, filed of even date herewith. It will however be understood that while the present invention is adapted for use in connection with different types of semi-trailers, it is particularly adapted for use in conjunction with the coupling and leg controlling mechanism disclosed in said application, and as indicated at A in Figure 11 of the present application and also in the previously recited patents.

Having thus described our invention, what we claim is:

1. In combination with a rigidly secured fifth wheel of a tractor adapted for connecting the tractor to different types of semi-trailers equipped with supporting legs; a folding king-pin pivoted to the rigidly secured fifth wheel, adapted to engage a coordinating coupling means carried by the trailer; a lock carried by the fifth wheel for supporting said king-pin in operative position to effect a coupling relation with the coupling means of a trailer.

2. In combination with a rigidly secured fifth wheel of a tractor adapted for connecting the tractor to different types of semi-trailers equipped with legs adapted to support the end of the trailer when detached from the tractor; a folding king-pin pivoted to the rigidly secured fifth wheel of the tractor, for engaging a coordinating coupling means carried by the trailer; a spring actuated latch carried by the fifth wheel for supporting said king-pin in operative position to effect a coupling relation with the coupling means of the trailer, said spring actuated latch being also adapted to secure a king-pin carried by the trailer in coupling relation with the tractor, upon first folding the king-pin pivoted to the rigidly secured fifth wheel of the tractor into an inoperative position.

3. In combination with the tiltable fifth wheel of a tractor; a folding king-pin adapted when manually raised to couple the tractor with a coordinating coupling means carried by a trailer; a spring actuated latch for maintaining said king-pin in an upright position that it may engage the coupling means of a trailer; a lever connected with the spring actuated latch for releasing the latch, whereby the tractor and trailer when coupled together may be disconnected, and the folding king-pin shifted to a non-coupling position; and means for securing said lever, whereby the spring actuated latch may be held in its retracted position until released.

4. In combination with a tiltable fifth wheel of a tractor, a folding king-pin pivoted between spaced walls depending from the underside of the fifth wheel, forming a channel through which the king-pin of the tractor may swing from a horizontal inoperative to an upright operative position; a spring actuated latch carried by the tractor for maintaining the king-pin in an upright position for entering into coupling relation with the coordinating coupling means of a trailer; a lever for retracting the spring actuated latch; means for securing said lever whereby the spring actuated latch may be held in its retracted position until released; and a depending spring actuated tripping pin carried by the fifth wheel and connected with the end of the lever, whereby the fifth wheel upon tilting under the weight of the trailer forces the tripping pin into contact with the tractor frame, thereby automatically releasing the lever and the spring actuated latch.

5. In combination with the fifth wheel of a tractor; a folding king-pin adapted for engagement with a coordinating coupling and braking mechanism of a semi-trailer; a telescoping driving pin fitted in a bore in the king-pin; a spring sleeved in the bore of the king-pin, adapted to force the driving-pin outwardly to the limit of its movement; means for securing said driving pin respectively in an outward and in a retracted position; means for securing the king-pin in an elevated coupling position; and means for automatically rocking said king-pin when released from an elevated coupling position to a non-coupling position.

6. In combination with the fifth wheel of a tractor; a folding king-pin pivoted to the fifth wheel adapted for coupling a semi-trailer to the tractor; a telescoping driving bolt fitted in a bore of the king-pin; a spring sleeved in the king-pin adapted to force the driving bolt outwardly that it may enter into engagement with a coordinating spirally grooved driving shaft of the trailer; means for maintaining said folding king-pin in an elevated coupling position; and a spring adapted to rock said king-pin from an elevated coupling position to a substantially horizontal non-coupling position.

7. In a co-ordinating coupling means for tractor-trailers wherein the trailer is equipped with supporting legs movable to a non-supporting position when coupled to a tractor and to a supporting position when released from coupling relation with the tractor, actuated through the rotation of a spirally grooved driven shaft journaled in the frame of the trailer; a fifth wheel; a folding king-pin pivoted to the fifth wheel having a spring actuated telescoping drive-pin, whereby upon raising the king-pin from an inoperative to an operative position, said telescoping drive-pin may enter the spiral groove of the driven shaft to rotatably actuate said shaft upon backing the tractor into the trailer, to raise said supporting legs, and to lower said legs by a reverse rotation of the shaft upon withdrawing the tractor from coupling relation with the trailer; and means for securing said drive-pin in a projected or retracted position.

8. In combination with the fifth wheel of a tractor for connecting the tractor to different types of semi-trailers equipped with supporting legs movable to a non-supporting position when coupled to the tractor; a folding king-pin pivoted to the fifth wheel adapted to engage coordinating coupling means carried by the trailer; a spring adapted to automatically shift said folding king-pin from an operative to a non-operative position; a stop to limit the movement of said king-pin when shifted to a non-operative position; a spring actuated latch carried by the fifth wheel for supporting said king-pin in operative position to effect a coupling relation with the coupling means of a trailer, said spring actuated latch being also adapted to secure a king-pin carried by a trailer in coupling relation with the tractor, upon first folding the king-pin of the tractor into an inoperative position.

9. In combination with the fifth wheel of a tractor for connecting the tractor to different types of semi-trailers equipped with supporting legs movable to a non-supporting position when coupled to the tractor; a folding king-pin pivoted to the fifth wheel adapted to engage a coordinating coupling means carried by the trailer; a spring actuated latch having a wedge-shaped end carried by the fifth wheel for supporting said king-pin in operative position to effect a coupling relation with the coupling means of a trailer, said spring actuated latch being also adapted to secure a king-pin carried by the trailer in coupling relation with the tractor when retracted by the thrust of the trailer king-pin upon the wedge-shaped end of the latch, the king-pin of the tractor having been first shifted into an inoperative position.

10. In combination with a rockable fifth wheel of a tractor, adapted for coupling said tractor to different types of trailers; a lock carried by the fifth wheel of the tractor, adapted to effect a coupling engagement with a coupling element carried by a trailer; a lever for releasing the lock; means for securing said lever, whereby the lock is held retracted until released; tripping means carried by the fifth wheel, adapted to release said lever, actuated by the weight of the trailer in coupling and uncoupling the tractor.

11. In combination with a rigidly secured fifth wheel of a tractor adapted to connect the tractor to different types of semi-trailers; a movable king-pin pivoted to the rigidly secured fifth wheel, adapted to engage coordinating coupling means carried by the trailer; a lock carried by the fifth wheel for supporting said king-pin in operative position to effect a coupling relation with the coupling means of the trailer, said lock being also adapted to secure a king-pin carried by a trailer in coupling relation with the tractor upon first folding the king-pin of the tractor into an inoperative position.

In testimony whereof, we sign this specification.

CHARLES H. LAND.
WILLIAM H. WILSON.